United States Patent [19]

Thompson

[11] 3,774,462

[45] Nov. 27, 1973

[54] VALVE ACTUATOR

[76] Inventor: James B. Thompson, 5405 Longmont, Houston, Tex. 77027

[22] Filed: Apr. 20, 1972

[21] Appl. No.: 245,989

[52] U.S. Cl. .................. 74/89.15, 74/424.8 VA
[51] Int. Cl. ............................. F16h 29/20
[58] Field of Search ............ 74/89.15, 424.8 VA; 251/58, 130, 133, 134, 138

[56] References Cited
UNITED STATES PATENTS

| | | | |
|---|---|---|---|
| 3,318,171 | 5/1967 | Wilkinson et al. | 74/89.15 X |
| 2,930,252 | 3/1960 | Sears et al. | 74/424.8 VA X |
| 3,011,359 | 12/1961 | Morrell | 74/89.15 X |

*Primary Examiner*—Charles J. Myhre
*Assistant Examiner*—F. D. Shoemaker
*Attorney*—Pravel, Wilson & Matthews

[57] ABSTRACT

Apparatus for operating a valve mounted in a flow line including a motor driving a threaded shaft having a traveling nut mounted thereon, support means supporting the motor so as to be substantially supported by the flow line such that the shaft is substantially free of extraneous forces; and, an actuating arm connecting the traveling nut to the valve whereby movement of the traveling nut opens and closes the valve.

10 Claims, 5 Drawing Figures

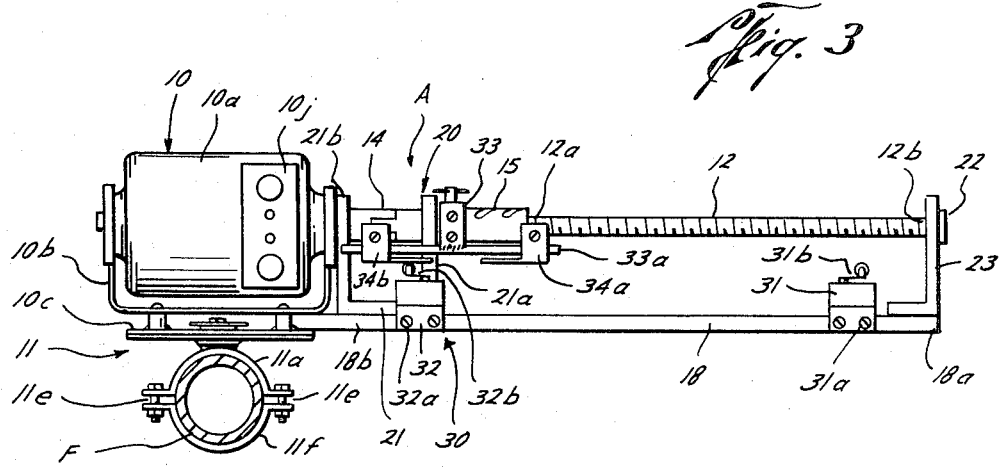
Fig. 3
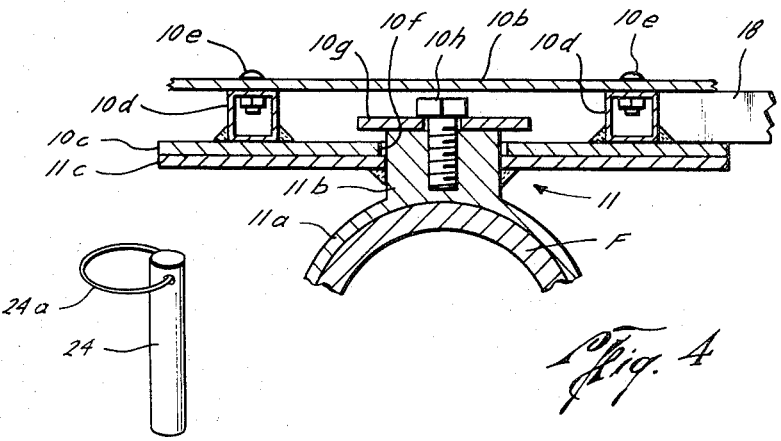
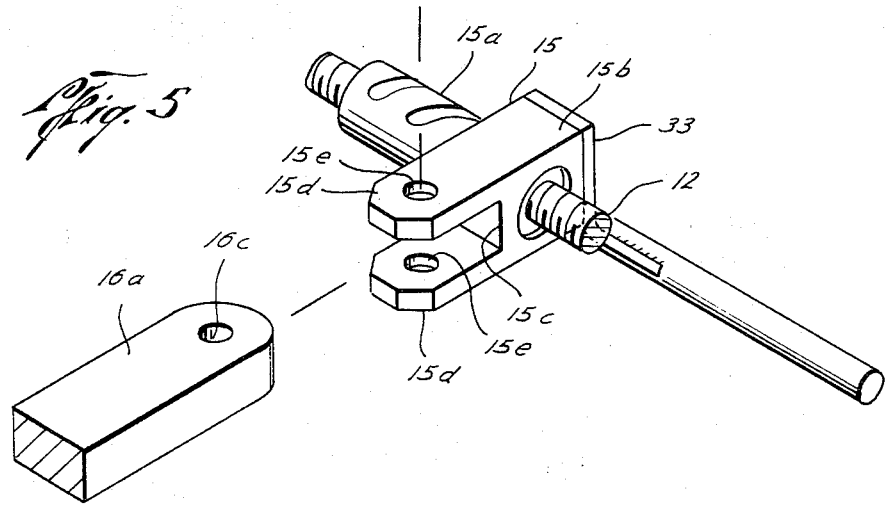
Fig. 4
Fig. 5

VALVE ACTUATOR

BACKGROUND OF THE INVENTION

The field of this invention is new and improved valve actuators.

Various types of valve actuators have been devised for applying substantial torque to rotatable valve elements to rotate the valve elements between open and closed positions. For example, U.S. Pat. No. 3,318,171 issued to Wilkinson, et al. discloses a valve actuator that rotates the valve element through a connection to a traveling nut which moves along a rotatable threaded shaft that is motor driven. In Wilkinson, however, the weight of the motor is substantially directed against the threaded shaft such that the shaft is subject to continuous bending or torsional stress which is likely to cause maintenance problems.

SUMMARY OF THE INVENTION

The present invention relates to a new and improved apparatus for providing substantial torque forces for opening and closing a valve mounted in a flow line wherein a motor means and threaded shaft are drivingly connected to move a traveling nut along the shaft. An actuator arm is connected to the valve and is pivotally and releasably connected to the traveling nut whereby rotation of the shaft by the motor means causes the valve to be opened and closed. The actuator arm is releasably connected to the traveling nut by a clevis connection which includes a removable pin whereby the actuator arm is freed for manual movement.

In one aspect of this invention, a support bracket is mounted onto the flow line to support the motor means directly above the flow line to substantially reduce extraneous forces acting to bend or bind the threaded shaft connected to the motor means. The threaded shaft is supported at both ends by bearings to enhance free rotation.

BRIEF DESCRIPTION OF THE DRAWINGS

FIG. 3 is a side view taken along line 3—3 of FIG. 2;

FIG. 4 is a sectional view of the motor support means of this invention; and

FIG. 5 is an assembly view of the releasable connection between the valve actuator arm and the traveling nut.

DESCRIPTION OF THE PREFERRED EMBODIMENT

Figure 1:
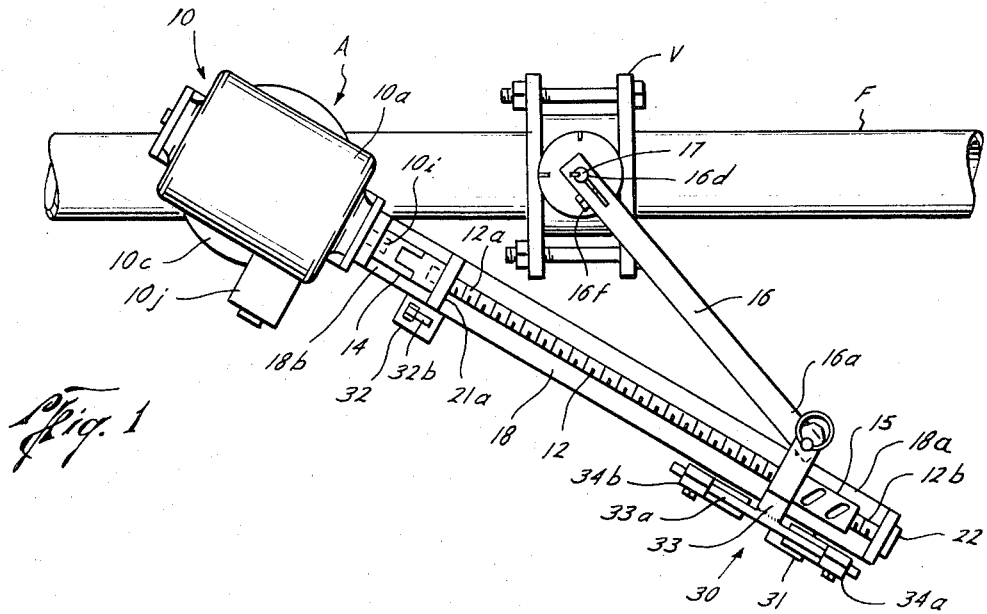
FIG. 1 is a top view of the valve actuator of the preferred embodiment of this invention illustrating the valve in the open position.

Referring to the drawings, the letter A generally designates the valve actuator of the preferred embodiment of this invention for moving a valve V mounted in flow line F between open and closed positions. Basically, the valve actuator A includes a motor means designated dsignated as 10 which is mounted directly on the flow line F by a support means 11. The motor means 10 is drivingly connected to a threaded shaft 12 by means of a coupling 14; and, a traveling nut 15 is threadedly mounted on the threaded shaft 12 whereby rotation of the shaft 12 causes the nut 15 to move along the shaft. An actuating arm 16 is pivotally connected to the nut 15 at end 16a and is attached to valve stem 17 of the valve V such that movement of the nut 15 causes pivoting of the actuating arm 16 and rotation of the valve stem 17 in order to move a valve element (not shown) attached to the valve stem 17 between open and closed positions within the valve V.

The support means 11 is provided for mounting the motor means 10 for pivotal movement directly over the flow line F so that the motor means 10 is completely supported on the flow line F thereby preventing any bending or binding forces from acting on the threaded shaft 12. Referring in particular to FIGS. 3 and 4 the support means 11 includes an upper semi-circular bracket or collar 11a having an upwardly extending vertical shaft base 11b as an integral part thereof. A flat circular mounting plate 11c is mounted over and secured to the shaft base 11b by welding or other suitable means. The upper collar 11a is mounted over and secured to the flow line F by a lower semi-circular bracket or collar 11f which is attached to the upper collar by nut and bolt combinations 11e. The motor 10a of the motor means 10 is mounted in a motor mounting bracket 10b by any suitable means. A flat, circular plate 10c is attached to the underside of the motor mounting bracket 10b through tubular memebers 10d, which are welded to the top side of plate 10c and bolted by nut and bolt combinations 10e to the motor mounting bracket 10b.

The plate 10c has an opening 10f which has a diameter slightly greater than the diameter of the shaft base 11b so that the motor 10a can be mounted over the shaft base 11b in such a position that the stationary plate 11c and plate 10c are mounted for rotating and slidable movement with respect to each other.

A cap 10g is secured to the shaft base 11b by bolt 10h to maintain the motor 10a and slidable plate 10c in position with repsect to the stationary base plate 11c. In this manner, the plate 10c which supports the motor 10a, is mounted for rotating and slidable movement with respect to the stationary plate 11c. The supporting of the motor 10a on the plates 11c and 10c serves to distribute the weight of the motor and balance it about the base shaft 11b. The motor 10a is thus mounted for pivotal movement directly onto and above the flow line F so that the flow line F completely supports the weight of the motor 10a thereby preventing any undue stress or bending on the threaded shaft 12. Although the motor 10a is shown to be mounted through plates 10c and 11c directly above the flow line F, it should be appreciated that the motor may be mounted indirectly with respect to the flow line F as long as the flow line F fully supports the motor such that no undue stress or bending forces are applied to the threaded shaft 12.

An elongated support bar 18 is mounted onto the moving circular plate 10c underneath the motor mounting bracket 10b by any suitable means such as welding. The support bar 18 mounts the threaded shaft 12 for rotation in the following manner. The coupling 14 which drivingly connects driving shaft 10i of the mojor 10a to end 12a of the threaded shaft 12 is positioned between upwardly extending supports 21a and 21b of a U-shaped support 21, which is mounted by suitable means to an end portion 18b of support bar 18. The coupling 14 includes bearing surfaces which engage the upwardly extending supports 21a and 21b thus mounting and supporting the end 12a of the threaded shaft 12 and the drive shaft 10i for rotation. End 12b of the threaded shaft 12 is mounted for rotation by means of a bearing 22 which is mounted in an upwardly extending L-shaped support 23, which is attached to the bar 18 by welding or other suitable means. In this manner, the threaded shaft 12 is secured at both ends 12a and 12b for rotation such that the threaded shaft is effectively secured against stress.

The traveling nut 15 includes a conventional ball bearing nut portion 15a having ball bearings helically aligned disposed on the inside thereof in threaded engagement with the threaded shaft 12 in order to reduce friction between the rotating threaded shaft 12 and the nut 15 as the nut moves along the shaft. A clevis connector member 15b is welded or otherwise attached to the ball bearing nut 15a for movement therewith. Referring to FIG. 5, the connector member 15b has a slot 15c machined therein and lugs 15d having aligned holes 15e to provide a clevis type of connection. The end portion 16a of the actuator arm 16 has a hole 16c therein which may be aligned with holes 15e in the lugs 15d in order to receive a releasable connecting pin 24. The releasable connecting pin 24 includes a ring 24a thereby allowing the pin 24 to be easily pulled out of the holes 15e and 16c to release the actuator arm 16 from connection with connector member 15b of the nut 15. The easy disconnection of the actuator arm 16 from the nut 15 allows the valve V to be manually opened and closed whenever desired.

The actuator arm 16 is releasably connected to the valve stem 17 in the following manner. A hole 16d having the configuration of the valve stem 17, which is keyed, is machined in end 16b of the actuator arm and a slot 16e is machined therein in communication with the hole 16d. A bolt 16f is threadedly mounted through the actuator arm 16 at the slot 16e such that tightening of the bolt 16b causes the slot 16e to reduce in width thereby reducing the size of the hole 16d so that the end 16b of the actuator arm 16 is secured about the valve stem 17. Whenever it is desired to disconnect the actuator arm 16 from the valve stem 17, the bolt 16b is loosened thereby increasing the size of the hole 16d to allow the end 16d of the actuator arm to be lifted off of the valve stem 17.

Limit means generally designated as 30 are mounted onto support bar 18 and with traveling nut 15 in order to limit the movement of the nut 15 along the threaded shaft 12 thereby limiting the amount of rotation of the actuator arm 16 and valve stem 17.

A limit switch 31 is mounted by means of screws such as 31a onto end 18a of the support bar 18. The limit switch 31 is of conventional construction and is electrically connected with electrical controls 10j for the motor 10a. Limit switch 32 is mounted at end 18b of the support bar by means of screws such as 32a and is also in electrical connection with the electrical controls 10j. The limit switch 31 is activated by depressing switch arm 31b and the limit switch 32 is activated by depressing switch arm 32b. The activation of either limit switch 31 or 32 opens the electrical circuit for the electrical controls 10j thereby shutting off the power to the motor 10a.

A T-shaped switch actuator bracket 33 is bolted onto connector member 15b of the nut 15 and includes a horizontally extending bar portion 33a. Actuator plates 34a and 34b are mounted by means of screws or other suitable means substantially near the ends of the horizontal bar portion 33a of the actuator element 33. The actuator plate 34 is positioned such that it will engage and depress the trigger arm 31b of the limit switch 31 as the traveling nut 15 approaches end 12b of the threaded shaft 12. Similarly, the actuator plate 34b will engage and depress trigger element 32b as the traveling nut approaches the end 12a of the threaded shaft.

Figure 2:
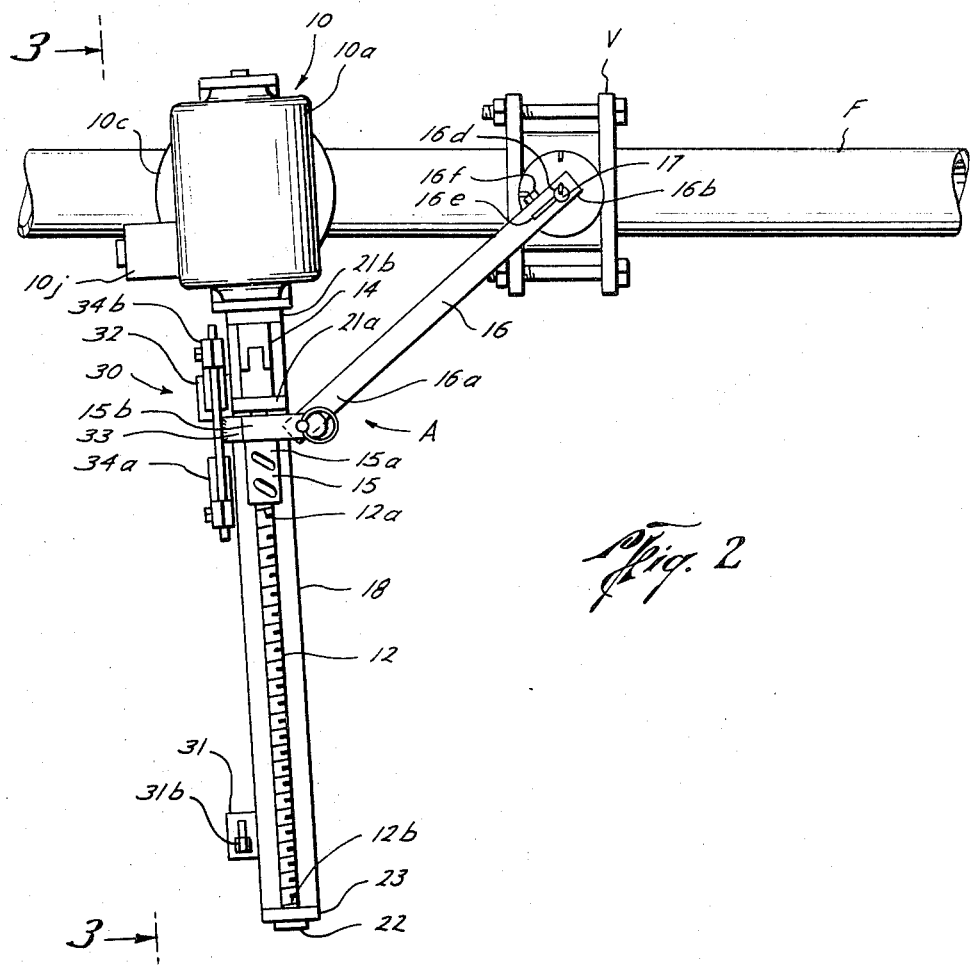
FIG. 2 is a top view of the valve actuator illustrating the valve in the closed position.

In operation and use of the valve actuator A of the preferred embodiment of this invention, the valve V is moved from the open position of FIG. 1 to the closed position of FIG. 2 in the following manner. Motor 10a is actuated through the controls 10j in the conventional manner to cause rotation of threaded shaft 12. The rotation of the threaded shaft causes the traveling nut to move along the threaded shaft from the position near end 12b of the threaded shaft to end 12a of the threaded shaft. Due to the length of the actuator arm 16, and further to the force exerted on end 16a of the actuator arm by the traveling nut 15, a very high torque can be exerted on valve stem 17 of the valve V. As the valve actuator A moves from the position of FIG. 1 to the position of FIG. 2, the motor 10a continually pivots clockwise as the actuator arm 16 is pivoted clockwise by the traveling nut 15 moving along threaded shaft 12. It is to be noted that the motor 10a is supported directly over the pipes such that the weight of the motor does not exert any extraneous forces on end 12a of the threaded shaft 12. The coupling 14 is secured by bearing means against the U-shaped support 21 thereby supporting end 12a of the shaft as well as motor shaft end 10i such that no extraneous forces, such as the force of resistance exerted through arm 16, can effect the rotation thereof.

As the nut 15 approaches end 12a of the threaded shaft 12, the actuator plate 34b mounted on the T-bar actuator element 33 engages and depresses trigger arm 32b to cause the limit switch 32 to open the circuit providing power to the electric motor 10a thereby cutting off the motor. The limit switch 32 is positioned such that the actuator arm 16 is moved exactly through an arc of 90° (or other arc if desired) so that the valve element (not shown) attached to the valve stem 17 is moved exactly and accurately to its closed position. Similarly, whenever the valve actuator A moves the valve V from the closed position of FIG. 2 to the open position of FIG. 1, the actuator plate 34a depresses trigger arm 31b of the limit switch 31 thereby shutting off power to the mojor 10a. The actuator plate 34a and limit switch 31 are positioned such that the actuator arm travels in an arc of exactly 90° from the position illustrated in FIG. 2 to the position illustrated in FIG. 1.

The foregoing disclosure and description of the invention are illustrative and explanatory thereof, and various changes in the size, shape and materials as well as in the details of the illustrated construction may be made without departing from the spirit of the invention. For example, the valve V may be any type of valve wherein the valve is opened or closed through rotation. It should also be understood that the motor means 10 and the limit switches 31 and 32 may be either electrically or pneumatically actuated.

I claim:

1. Apparatus for operating a valve mounted in a flow line, comprising:
   motor means;
   a threaded shaft drivingly connected to said motor means;

support means separate from said valve and pivotally mounting said motor means on said flow line, said support means including bearing support means for mounting said threaded shaft for rotation whereby said threaded shaft is substantially free of extraneous forces;

a traveling nut threadedly mounted with said threaded shaft; and an actuator arm connected to said traveling nut and to said valve whereby rotation of said shaft by said motor means causes said traveling nut and actuator arm to cooperate to move said valve between open and closed positions.

2. The structure set forth in claim 1, wherein said support means includes:

bracket means mounted on said flow line for directly suporting said motor means on said flow line whereby the weight of said motor means is substantially supported on said flow line.

3. The structure set forth in claim 2, wherein:

said bracket means mounts said motor means directly above said flow line.

4. The structure set forth in claim 1, wherein:

said bearing support means supports said threaded shaft at substantially the ends thereof.

5. The structure set forth in claim 1, including:

pivotal connecting means for pivotally connecting said actuator arm to said traveling nut.

6. The structure set forth in claim 1, including:

releasable connecting means for releasably connecting said actuator arm to said traveling nut.

7. The structure set forth in claim 6, wherein said releasable connecting means includes:

said traveling nut having a clevis connection;

a pin attaching said actuator arm with said clevis connection, said pin being removable whereby said actuator arm is free for manual operation.

8. The structure set forth in claim 1, including:

limit means mounted with said bearing support means and with said traveling nut for limiting movement of said traveling nut along said threaded shaft.

9. The structure set forth in claim 8, including:

said motor means being electrically powered;

said limit means including limit switches mounted with said bearing support means in proximity to the ends of said threaded shaft; said limit switches being electrically connected to said motor means; and said limit means further including an activating element mounted with said traveling nut for activating said limit switches whereby the movement of said traveling nut along said threaded shaft is limited.

10. The structure set forth in claim 1, wherein said support means includes:

bracket means mounted on said flow line and including a base shaft having a stationary plate attached thereto;

a motor bracket attached to said motor means and having a rotatable plate mounted thereon whereby said rotatable plate is slidably mounted on said stationary plate for rotation about said base shaft.

* * * * *